(12) United States Patent
Tang et al.

(10) Patent No.: US 11,048,650 B1
(45) Date of Patent: Jun. 29, 2021

(54) METHOD AND SYSTEM FOR INTEGRATING PROCESSING-IN-SENSOR UNIT AND IN-MEMORY COMPUTING UNIT

(71) Applicant: NATIONAL TSING HUA UNIVERSITY, Hsinchu (TW)

(72) Inventors: Kea-Tiong Tang, Taipei (TW); Meng-Fan Chang, Taichung (TW); Chih-Cheng Hsieh, Hsinchu County (TW); Syuan-Hao Sie, New Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/894,899

(22) Filed: Jun. 8, 2020

(30) Foreign Application Priority Data

Feb. 14, 2020 (TW) .................................. 109104791

(51) Int. Cl.
*G06F 13/16* (2006.01)
*G06F 1/10* (2006.01)
*G06N 3/06* (2006.01)

(52) U.S. Cl.
CPC ............ *G06F 13/1668* (2013.01); *G06F 1/10* (2013.01); *G06N 3/06* (2013.01)

(58) Field of Classification Search
None
See application file for complete search history.

(56) References Cited

U.S. PATENT DOCUMENTS 9,218,061 B2 * 12/2015 Majumder .............. G06F 3/017
2013/0101275 A1 * 4/2013 Vitsnudel ................ G06F 3/042
386/353
2019/0317548 A1 * 10/2019 Thong ....................... G06F 1/12

* cited by examiner

*Primary Examiner* — Michael Sun
(74) *Attorney, Agent, or Firm* — CKC & Partners Co., LLC

(57) ABSTRACT

A method for integrating a processing-in-sensor unit and an in-memory computing includes the following steps. A providing step is performed to transmit the first command signal and the initial data to the in-memory computing unit. A converting step is performed to drive the first command signal and the initial data to convert to a second command signal and a plurality of input data through a synchronizing module. A fetching step is performed to drive a frame difference module to receive the input data to fetch a plurality of difference data. A slicing step is performed to drive a bit-slicing module to receive the difference data and slice each of the difference data into a plurality of bit slices. A controlling step is performed to encode the difference address into a control signal, and the in-memory computing unit accesses each of the bit slices according to the control signal.

10 Claims, 6 Drawing Sheets

METHOD AND SYSTEM FOR INTEGRATING PROCESSING-IN-SENSOR UNIT AND IN-MEMORY COMPUTING UNIT

RELATED APPLICATIONS

This application claims priority to Taiwan Application Serial Number 109104791, filed Feb. 14, 2020, which is herein incorporated by reference.

BACKGROUND

Technical Field

The present disclosure relates to a method and a system for integrating a processing-in-sensor unit and an in-memory computing unit. More particularly, the present disclosure relates to a method and a system for integrating a processing-in-sensor unit and an in-memory computing unit for image recognition.

Description of Related Art

There are two keys to image recognition technology applied by the general deep neural networks (DNN): Processing-In-Sensor (PIS) and In-Memory Computing (CIM). PIS is an image-fetching device (such as a digital camera) which performs preliminary preprocessing on the recorded original image data. PIS can realize edge extraction, quantification or calculation of low-layer neural networks. CIM is an operation of "Convolutional layer" or even "Fully Connected Layer" in the DNN. CIM has both memory and accelerator functions. An image recognition system needs to have both features to achieve a complete and efficient image recognition application.

Traditionally, according to the Von Neumann model, if pixel array or in-memory data need to be processed, the data needs to be transferred to a computing unit (such as a processor) for calculation. However, the pixel array and the in-memory data are processed independently and carried out calculations and data transfer between units through various carriers. A large amount of data easily leads to inefficient energy and energy consumption during the transportation process. Currently, there is no system for communicating and integrating the pixel array and the in-memory data.

SUMMARY

According to an embodiment of the present disclosure, a method for integrating a processing-in-sensor unit and an in-memory computing unit. The processing-in-sensor unit operated on a first clock frequency, and the in-memory computing unit operated on a second clock frequency. The method for integrating the processing-in-sensor unit and the in-memory computing unit includes a providing step, a converting step, a fetching step, a slicing step and a controlling step. The providing step is performed to drive the processing-in-sensor unit to provide a first command signal and a plurality of initial data and transmit the first command signal and the initial data to a bus unit. The first command signal and each of the initial data are operated on the first clock frequency. The bus unit includes a synchronizing module and a frame difference module. The converting step is performed to drive the synchronizing module to receive the first command signal and the initial data. The first command signal and the initial data are converted into a second command signal and a plurality of input data through the synchronizing module. The second command signal and each of the input data are operated on the second clock frequency. The first clock frequency is different from the second clock frequency, so that the second command signal is transmitted to the in-memory computing unit. The fetching step is performed to drive the frame difference module to receive the input data and fetch a plurality of difference data according to the input data. Each of the difference data has a difference address. The slicing step is performed to drive a bit-slicing module to receive the difference data and slice each of the difference data into a plurality of bit slices. The controlling step is performed to drive an encoding module to receive the difference addresses and encode the difference addresses into a control signal. The in-memory computing unit accesses each of the bit slices according to the control signal.

According to another embodiment of the present disclosure, a system for integrating a processing-in-sensor unit and an in-memory computing unit includes the processing-in-sensor unit, a bus unit and the in-memory computing unit. The processing-in-sensor unit includes a microprocessor and a sensor. The microprocessor is electrically connected to the sensor for generating a first command signal and a plurality of initial data. The bus unit is electrically connected to the processing-in-sensor unit, and the bus unit includes a synchronizing module, a frame difference module, a bit-slicing module and an encoding module. The synchronizing module is electrically connected to the microprocessor and receiving the first command signal and the initial data to generate a second command signal and a plurality of input data. The frame difference module is electrically connected to the synchronizing module. The frame difference module receives the input data to generate a plurality of difference data, and each of the difference data has a difference address. The bit-slicing module is electrically connected to the frame difference module. The bit-slicing module receives the difference data to generate a plurality of bit slices. The encoding module is electrically connected to the frame difference module. The encoding module receives the difference addresses to generate a control signal. The in-memory computing unit is electrically connected to the bus unit. The in-memory computing unit accesses each of the bit slices according to the control signal.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
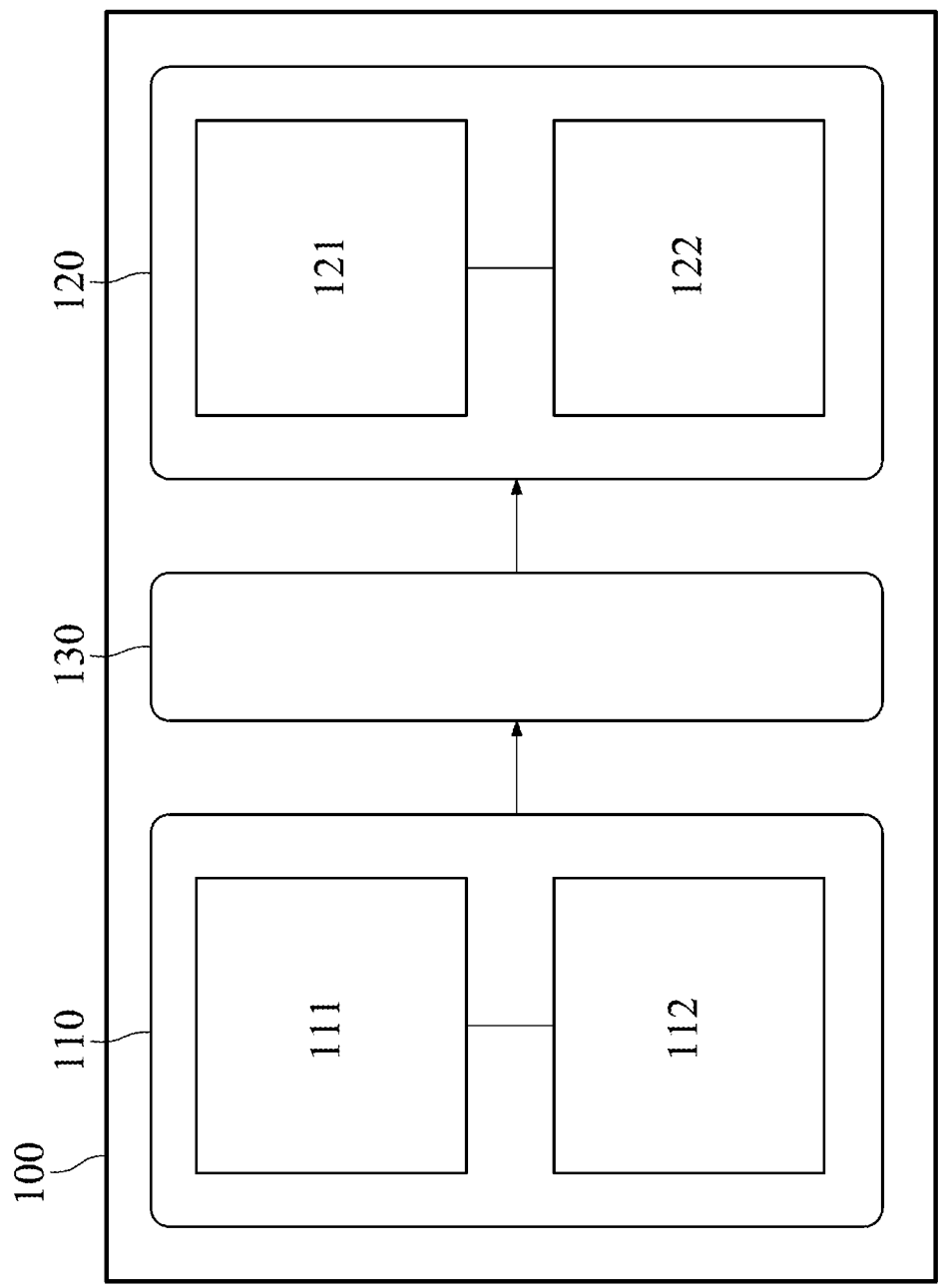
FIG. 1 is a block diagram of a system for integrating a processing-in-sensor unit and an in-memory computing unit according to an embodiment of a structural aspect of the present disclosure.
Figure 2:
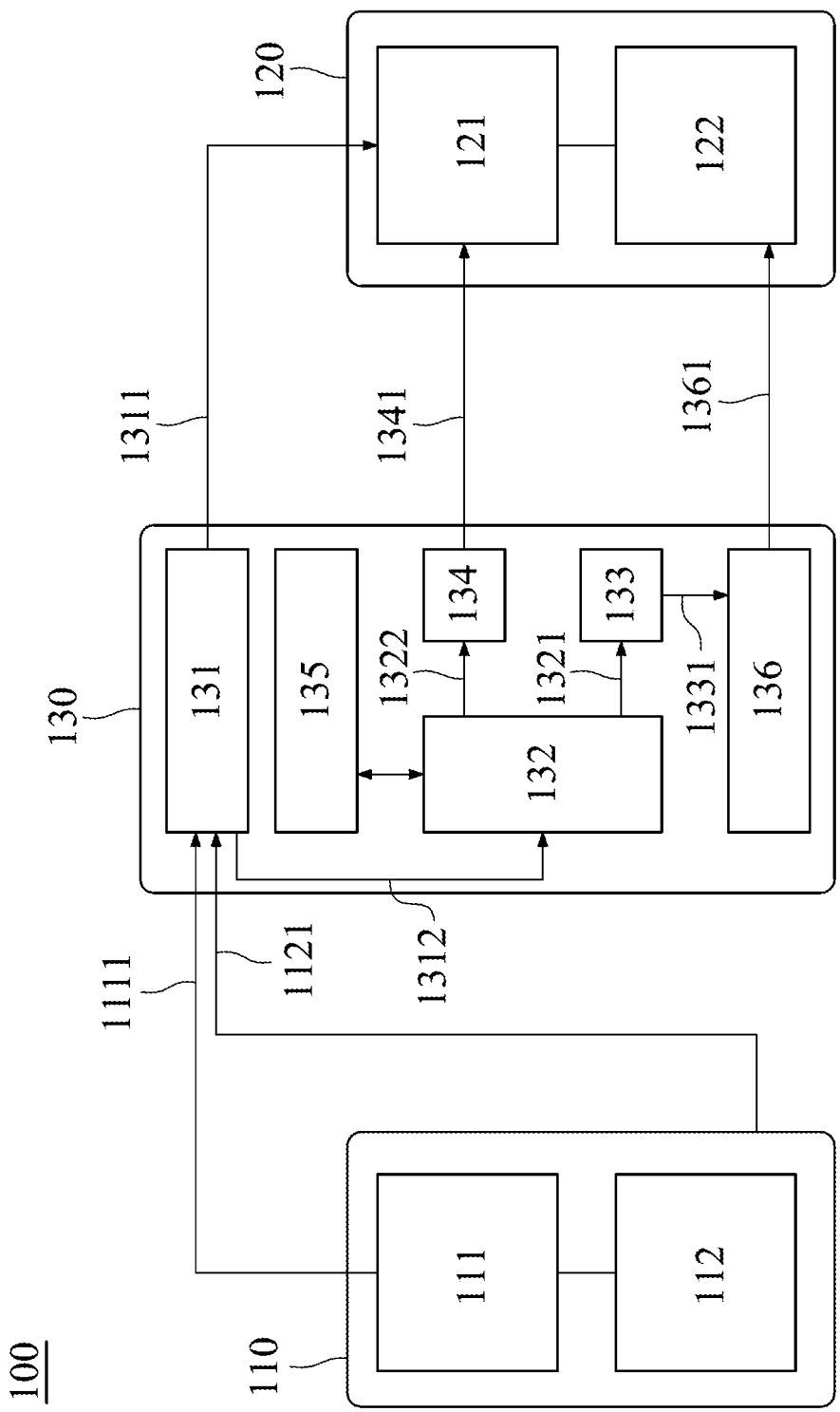
FIG. 2 is a block diagram of the system for integrating the processing-in-sensor unit and the in-memory computing unit according to another embodiment of a structural aspect of the present disclosure.

FIG. 1 is a block diagram of a system 100 for integrating a processing-in-sensor unit 110 and an in-memory computing unit 120 according to an embodiment of a structural aspect of the present disclosure. FIG. 2 is a block diagram of the system 100 for integrating the processing-in-sensor unit 110 and the in-memory computing unit 120 according to another embodiment of a structural aspect of the present disclosure. In FIGS. 1 and 2, the system 100 for integrating the processing-in-sensor unit 110 and the in-memory computing unit 120 includes the processing-in-sensor unit 110, the in-memory computing unit 120 and a bus unit 130. The processing-in-sensor unit 110 includes a microprocessor 111 and a sensor 112. The microprocessor 111 is electrically connected to the sensor 112 for generating a first command signal 1111 and a plurality of initial data 1121.

The bus unit 130 is electrically connected to the processing-in-sensor unit 110, and the bus unit 130 includes a synchronizing module 131, a frame difference module 132, a bit-slicing module 133 and an encoding module 134. The synchronizing module 131 is electrically connected to the microprocessor 111 and receiving the first command signal 1111 and the initial data 1121 to generate a second command signal 1311 and a plurality of input data 1312. The frame difference module 132 is electrically connected to the synchronizing module 131. The frame difference module 132 receives the input data 1312 to generate a plurality of difference data 1321, and each of the difference data 1321 has a difference address 1322. The bit-slicing module 133 is electrically connected to the frame difference module 132. The bit-slicing module 133 receives the difference data 1321 to generate a plurality of bit slices 1331. The encoding module 134 is electrically connected to the frame difference module 132. The encoding module 134 receives the difference addresses 1322 to generate a control signal 1341. The in-memory computing unit 120 is electrically connected to the bus unit 130. The in-memory computing unit 120 accesses each of the bit slices 1331 according to the control signal 1341.

Therefore, the system 100 for integrating the processing-in-sensor unit 110 and the in-memory computing unit 120 of the present disclosure can transmit the data output by the processing-in-sensor unit 110 to the in-memory computing unit 120 for calculation through the bus unit 130. It is favorable for reducing energy consumption and time during data transmission.

Figure 3:
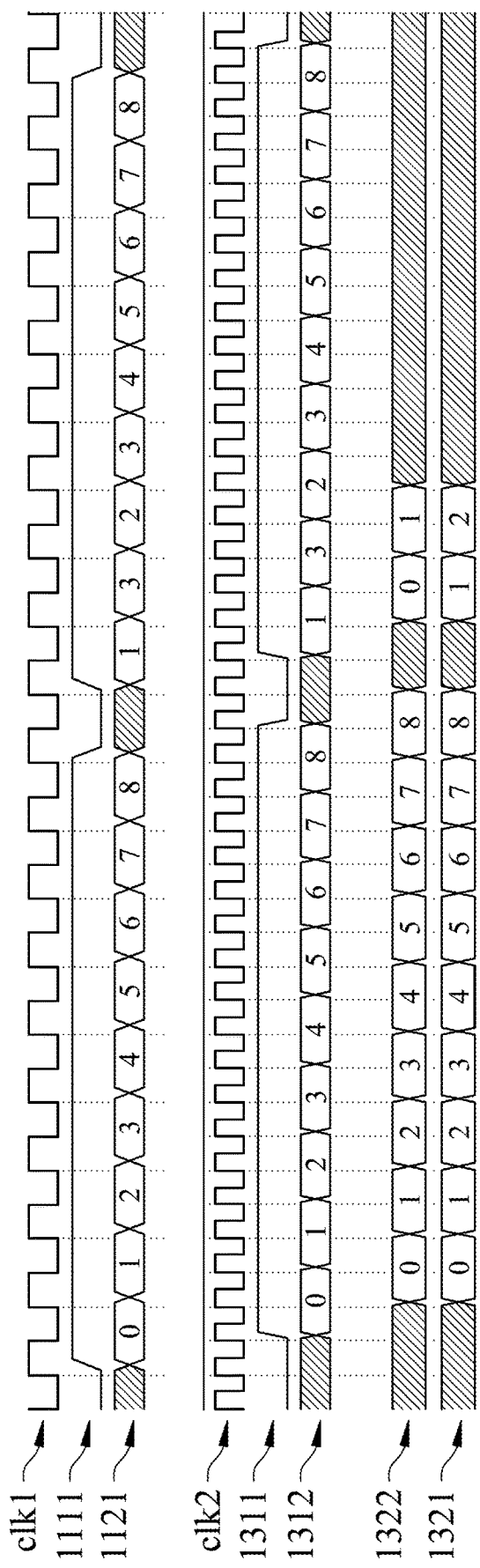
FIG. 3 is a schematic view of converting a first command signal and a plurality of initial data to a second command signal and a plurality of input data according to the system for integrating the processing-in-sensor unit and the in-memory computing unit of FIG. 2.

In FIGS. 2 and 3, FIG. 3 is a schematic view of converting the first command signal 1111 and the initial data 1121 to the second command signal 1311 and the input data 1312 according to the system 100 for integrating the processing-in-sensor unit 110 and the in-memory computing unit 120 of FIG. 2. In FIG. 3, when the first command signal 1111 rises to 1, the processing-in-sensor unit 110 is ready to transmit the pre-processed data to the bus unit 130. The initial data 1121 is sequentially output through a data port (not shown) of the processing-in-sensor unit 110. The processing-in-sensor unit 110 can be operated on a first clock frequency clk1 (such as 10 KHz), and the in-memory computing unit 120 can be operated on a second clock frequency clk2 (such as 100 KHz). The first clock frequency clk1 is different from the second clock frequency clk2, so that the first clock frequency clk1 of the first command signal 1111 and the initial data 1121 is converted into the second clock frequency clk2 of the second command signal 1311 and the input data 1312 through the synchronizing module 131. Therefore, the data is synchronized and transmitted from the processing-in-sensor unit 110 to the in-memory computing unit 120.

More specifically, the bus unit 130 can further include a memory 135. The memory 135 is electrically connected to the frame difference module 132. The memory 135 stores one of the input data 1312. The frame difference module 132 reads one of the input data 1312 in the memory 135 and compares the one of the input data 1312 with another one of the input data 1312 to fetch out each of the difference data 1321. In detail, the frame difference module 132 sequentially receives each of the input data 1312. One of the input data 1312 is stored in the memory 135, and the next one of the input data 1312 (that is, another one of the input data 1312) is compared with the input data 1312 of the memory 135 to retrieve each difference 1321 (such as "012345678" and "12" in FIG. 3). Therefore, it is favorable for reducing the amount of excess data transmitted so as to improve transmission efficiency.

Figure 4:
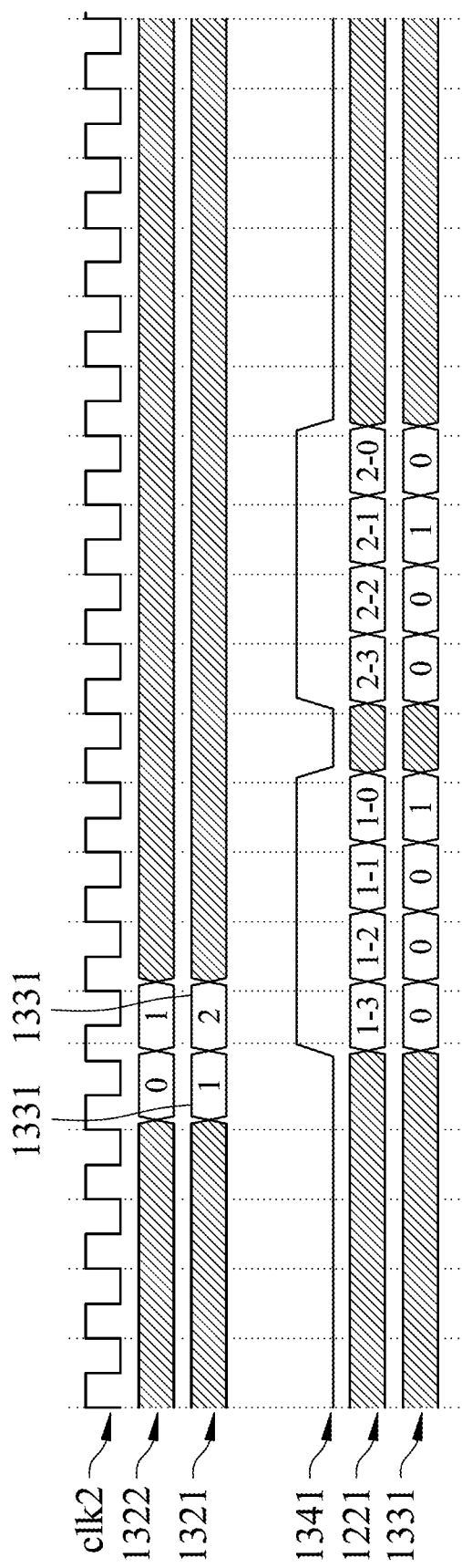
FIG. 4 is a schematic view of slicing a plurality of difference data into a plurality of bit slices according to the system for integrating the processing-in-sensor unit and the in-memory computing unit of FIG. 2.

In FIGS. 2 and 4, FIG. 4 is a schematic view of slicing the difference data 1321 into the bit slices 1331 according to the system 100 for integrating the processing-in-sensor unit 110 and the in-memory computing unit 120 of FIG. 2. The bit-slicing module 133 receives the difference data 1321 and slices each of the difference data 1321 into the bit slices 1331. The encoding module 134 receives the difference addresses 1322 and encodes the difference addresses into the control signal 1341, and the in-memory computing unit 120 accesses each of the bit slices 1331 according to the control signal 1341. Furthermore, the in-memory computing unit 120 includes a processing unit 121 and a static random access memory (SRAM) 122. The processing unit 121 is electrically connected to the synchronizing module 131 and the encoding module 134 and receiving the second command signal 1311 and the control signal 1341. The SRAM 122 is electrically connected to the processing unit 121, and the SRAM 122 accesses each of the bit slices 1331 according to the control signal 1341. In detail, each bit of each piece of data inside the in-memory computing unit 120 has different addresses, so it is necessary to cut the data into a bit-serial for inputting, and the bit-serial is written into a corresponding SRAM address 1221. When the control signal 1341 rises to 1, the bit slice 1331 is written into the SRAM 122 according to the SRAM address 1221.

Moreover, the bus unit 130 can further include a transmitting module 136. The transmitting module 136 is electrically connected to the bit-slicing module 133 and the SRAM 122, the transmitting module 136 receives the bit slices 1331 and converts the bit slices 1331 into an output datum 1361, and the output datum 1361 is transmitted to the SRAM 122. In detail, each of the bit slices 1331 has a first bandwidth (for example: 1'b1). The output datum 1361 has a second bandwidth (for example: 16 bits/cycle), and the first bandwidth is different from the second bandwidth. Therefore, the output datum 1361 can satisfy an input bandwidth of the in-memory computing unit 120.

Figure 5:
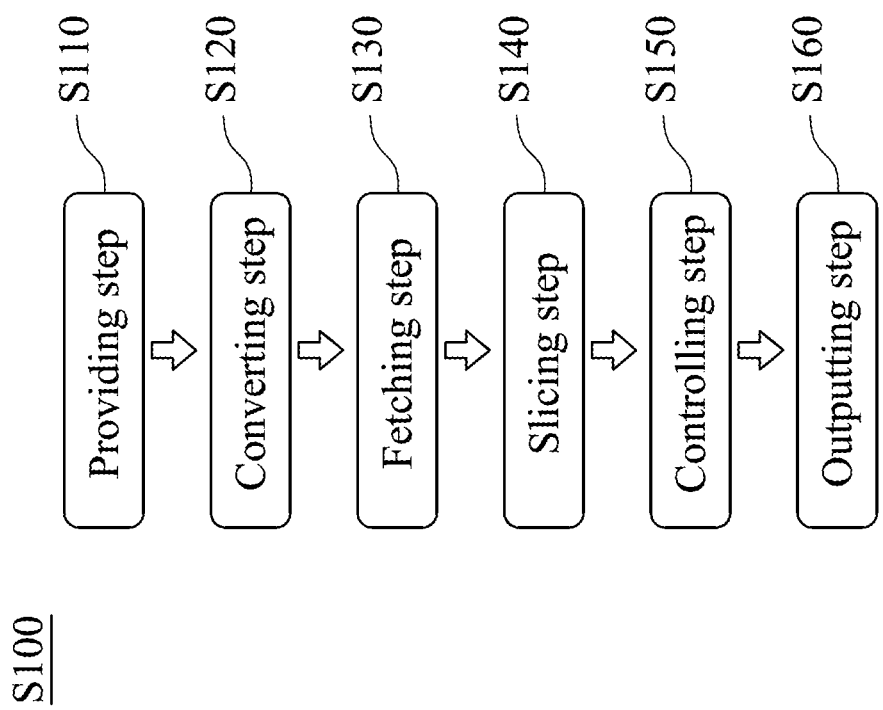
FIG. 5 is a flow chart of a method for integrating the processing-in-sensor unit and the in-memory computing unit according to an embodiment of a methodical aspect of the present disclosure.

FIG. 5 is a flow chart of a method S100 for integrating the processing-in-sensor unit 110 and the in-memory computing unit 120 according to an embodiment of a methodical aspect of the present disclosure. In FIG. 5, the method S100 for integrating the processing-in-sensor unit 110 and the in-memory computing unit 120 includes a providing step S110, a converting step S120, a fetching step S130, a slicing step S140 and a controlling step S150.

In FIGS. 2 and 5, in detail, the processing-in-sensor unit 110 is operated on the first clock frequency clk1, and the in-memory computing unit 120 is operated on the second clock frequency clk2. The providing step S110 is performed to drive the processing-in-sensor unit 110 to provide the first command signal 1111 and the initial data 1121 and transmit the first command signal 1111 and the initial data 1121 to the bus unit 130. The first command signal 1111 and each of the initial data 1121 are operated on the first clock frequency clk1. The bus unit 130 includes the synchronizing module 131 and the frame difference module 132. The converting step S120 is performed to drive the synchronizing module 131 to receive the first command signal 1111 and the initial data 1121. The first command signal 1111 and the initial data 1121 are converted into the second command signal 1311 and the input data 1312 through the synchronizing module 131. The second command signal 1311 and each of the input data 1312 are operated on the second clock frequency clk2. The first clock frequency clk1 is different from the second clock frequency clk2, so that the second command signal 1311 is transmitted to the in-memory computing unit 120. The fetching step S130 is performed to drive the frame difference module 132 to receive the input data 1312 and fetch the difference data 1321 according to the input data 1312. Each of the difference data 1321 has the difference address 1322. The slicing step S140 is performed to drive the bit-slicing module 133 to receive the difference data 1321 and slice each of the difference data 1321 into the bit slices 1331. The controlling step S150 is performed to drive the encoding module 134 to receive the difference addresses 1322 and encode the difference addresses 1322 into the control signal 1341. The in-memory computing unit 120 accesses each of the bit slices 1331 according to the control signal 1341.

Therefore, the method S100 for integrating the processing-in-sensor unit 110 and the in-memory computing unit 120 of the present disclosure can transmit the data output from the processing-in-sensor unit 110 to the in-memory computing unit 120 for calculation by the providing step S110, the converting step S120, the fetching step S130, the slicing step S140 and the controlling step S150.

For example, in FIG. 5, in the providing step S110 of the method S100 for integrating the processing-in-sensor unit 110 and the in-memory computing unit 120, when the first command signal 1111 is 1, each of the input data 1312 is sequentially transmitted to the bus unit 130. When the first command signal 1111 is 0, each of the input data 1312 is not transmitted to the bus unit 130. Furthermore, the first clock frequency clk1 can be 10 KHz, and the second clock frequency clk2 can be 100 KHz. Subsequently, in the converting step S120, the first clock frequency clk1 of the first command signal 1111 and the initial data 1121 is converted into the second clock frequency clk2 of the second command signal 1311 and the input data 1312 through the synchronizing module 131. Therefore, the data is synchronized and transmitted from the processing-in-sensor unit 110 to the in-memory computing unit 120.

Figure 6:
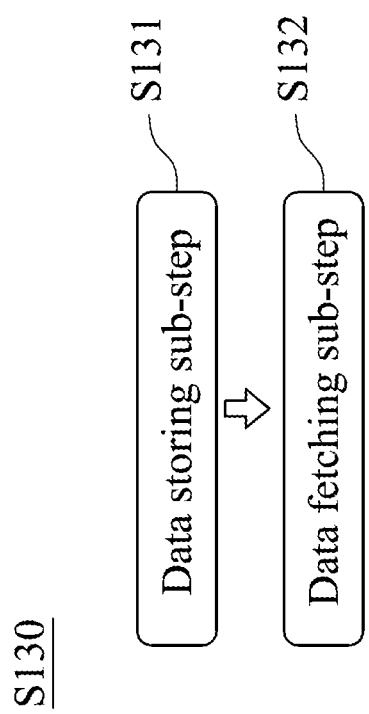
FIG. 6 is a flow chart of a fetching step according to the method for integrating the processing-in-sensor unit and the in-memory computing unit of FIG. 5.

In FIGS. 5 and 6, FIG. 6 is a flow chart of the fetching step S130 according to the method S100 for integrating the processing-in-sensor unit 110 and the in-memory computing unit 120 of FIG. 5. The bus unit 130 can further include the memory 135. The fetching step S130 includes a data storing sub-step S131 and a data fetching sub-step S132. The data storing sub-step S131 is performed to drive the memory 135 to store one of the input data 1312. The data fetching sub-step S132 is performed to drive the frame difference module 132 to read one of the input data 1312 and compare the one of the input data 1312 with another one of the input data 1312 to fetch out each of the difference data 1321. Therefore, it is favorable for reducing the amount of excess data transmitted so as to improve transmission efficiency.

Specifically, the difference data 1321 can be 4 bits or 8 bits during one cycle. However, the in-memory computing unit 120 can only store 1 bit when writing or storing the data. Therefore, in the slicing step S140, the bit-slicing module 133 receives the difference data 1321 and slices each of the difference data 1321 into the bit slices 1331.

In FIGS. 2 and 4, the in-memory computing unit 120 can include the SRAM 122. In the controlling step S150, the encoding module 134 receives the difference addresses 1322 and encodes the difference addresses into the control signal 1341, and the in-memory computing unit 120 accesses each of the bit slices 1331 according to the control signal 1341. In detail, each bit of each piece of data inside the in-memory computing unit 120 has different addresses, so it is necessary to cut the data into a bit-serial for inputting, and the bit-serial is written into a corresponding SRAM address 1221. When the control signal 1341 is 1, each of the bit slices 1331 is sequentially written into the SRAM 122 according to the SRAM 122. When the control signal 1341 is 0, each of the bit slices 1331 is not written into the SRAM 122.

Moreover, the method S100 for integrating the processing-in-sensor unit 110 and the in-memory computing unit 120 can further include an outputting step S160. The outputting step S160 is performed to drive the transmitting module 136 to receive the bit slices 1331 and convert the bit slices 1331 into the output datum 1361, so that the output datum 1361 is transmitted to the in-memory computing unit 120. Each of the bit slices 1331 has the first bandwidth (for example: 1'b1), and the output datum 1361 has the second bandwidth (for example: 16 bits/cycle). Therefore, the output datum 1361 can satisfy the input bandwidth of the in-memory computing unit 120.

In summary, the present disclosure has the following advantages: First, the data output from the processing-in-sensor unit can be transmitted to the in-memory computing unit for calculation. Second, it is favorable for reducing energy consumption and time of the operation. Third, it is favorable for reducing the amount of excess data transmitted so as to improve transmission efficiency.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for integrating a processing-in-sensor unit and an in-memory computing unit, the processing-in-sensor unit operated on a first clock frequency, the in-memory computing unit operated on a second clock frequency, and the method for integrating the processing-in-sensor unit and the in-memory computing unit comprising:

performing a providing step to drive the processing-in-sensor unit to provide a first command signal and a plurality of initial data and transmit the first command signal and the initial data to a bus unit, wherein the first command signal and each of the initial data are operated on the first clock frequency, and the bus unit comprises a synchronizing module and a frame difference module;

performing a converting step to drive the synchronizing module to receive the first command signal and the initial data, wherein the first command signal and the initial data are converted into a second command signal and a plurality of input data through the synchronizing module, the second command signal and each of the input data are operated on the second clock frequency, the first clock frequency is different from the second clock frequency, and the second command signal is transmitted to the in-memory computing unit;

performing a fetching step to drive the frame difference module to receive the input data and fetch a plurality of difference data according to the input data, wherein each of the difference data has a difference address;

performing a slicing step to drive a bit-slicing module to receive the difference data and slice each of the difference data into a plurality of bit slices; and performing a controlling step to drive an encoding module to receive the difference addresses and encode the difference addresses into a control signal, wherein the in-memory computing unit accesses each of the bit slices according to the control signal.

2. The method for integrating the processing-in-sensor unit and the in-memory computing unit of claim 1, wherein in the providing step, when the first command signal is 1, each of the input data is sequentially transmitted to the bus unit; and when the first command signal is 0, each of the input data is not transmitted to the bus unit.

3. The method for integrating the processing-in-sensor unit and the in-memory computing unit of claim 1, wherein the bus unit further comprises a memory, and the fetching step comprises:

performing a data storing sub-step to drive the memory to store the input data; and performing a data fetching sub-step to drive the frame difference module to read one of the input data and compare the one of the input data with another one of the input data to fetch out each of the difference data.

4. The method for integrating the processing-in-sensor unit and the in-memory computing unit of claim 1, further comprising:

performing an outputting step to drive a transmitting module to receive the bit slices and convert the bit slices into an output datum, wherein the output datum is transmitted to the in-memory computing unit;

wherein each of the bit slices has a first bandwidth, the output datum has a second bandwidth, and the first bandwidth is different from the second bandwidth.

5. The method for integrating the processing-in-sensor unit and the in-memory computing unit of claim 4, wherein the in-memory computing unit comprises a static random access memory (SRAM), and the controlling step comprises:

when the control signal is 1, each of the bit slices is sequentially written into the SRAM; and when the control signal is 0, each of the bit slices is not written into the SRAM.

6. A system for integrating a processing-in-sensor unit and an in-memory computing unit, comprising:

the processing-in-sensor unit comprising a microprocessor and a sensor, wherein the microprocessor is electrically connected to the sensor for generating a first command signal and a plurality of initial data;

a bus unit electrically connected to the processing-in-sensor unit, and comprising:

a synchronizing module electrically connected to the microprocessor and receiving the first command signal and the initial data to generate a second command signal and a plurality of input data;

a frame difference module electrically connected to the synchronizing module, wherein the frame difference module receives the input data to generate a plurality of difference data, and each of the difference data has a difference address;

a bit-slicing module electrically connected to the frame difference module, wherein the bit-slicing module receives the difference data to generate a plurality of bit slices; and an encoding module electrically connected to the frame difference module, wherein the encoding module receives the difference addresses to generate a control signal; and the in-memory computing unit electrically connected to the bus unit, wherein the in-memory computing unit accesses each of the bit slices according to the control signal.

7. The system for integrating the processing-in-sensor unit and the in-memory computing unit of claim 6, wherein, the processing-in-sensor unit operated on a first clock frequency; and the in-memory computing unit operated on a second clock frequency;

wherein the first clock frequency is converted into the second clock frequency through the synchronizing module;

wherein the first clock frequency is different from the second clock frequency.

8. The system for integrating the processing-in-sensor unit and the in-memory computing unit of claim 6, wherein the further comprises:

a memory electrically connected to the frame difference module;

wherein the memory stores one of the input data, the frame difference module reads one of the input data in the memory and compares the one of the input data with another one of the input data to fetch out each of the difference data.

9. The system for integrating the processing-in-sensor unit and the in-memory computing unit of claim 6, wherein the in-memory computing unit comprises:
a processing unit electrically connected to the synchronizing module and the encoding module and receiving the second command signal and the control signal;
a static random access memory (SRAM) electrically connected to the processing unit, wherein the SRAM accesses each of the bit slices according to the control signal.

10. The system for integrating the processing-in-sensor unit and the in-memory computing unit of claim 6, wherein the bus unit further comprises:
a transmitting module electrically connected to the bit-slicing module and the SRAM, wherein the transmitting module receives the bit slices and converts the bit slices into an output datum, the output datum is transmitted to the SRAM;
wherein each of the bit slices has a first bandwidth, the output datum has a second bandwidth, the first bandwidth is different from the second bandwidth.

* * * * *